Oct. 14, 1969
J. L. HARVEY ET AL  3,472,720
METHOD OF FORMING FELT-FACED WOOD WOOL SLAB
Filed May 11, 1966
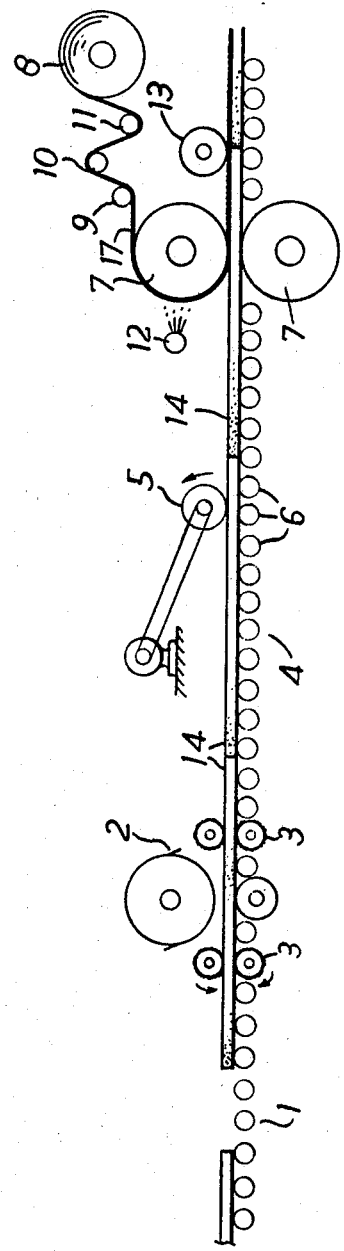

3,472,720
METHOD OF FORMING FELT-FACED WOOD WOOL SLAB
Jack Lane Harvey, Gravesend, Kent, and Joseph Dunn Hudson, Lostock, Bolton, England, assignors to BPB Industries Limited, Loughborough, Leicestershire, England
Filed May 11, 1966, Ser. No. 554,627
Claims priority, application Great Britain, May 28, 1965, 22,840/65; July 8, 1965, 29,066/65
Int. Cl. C09j 5/06
U.S. Cl. 156—320       6 Claims

ABSTRACT OF THE DISCLOSURE

The manufacture of a laminate comprising a wood wool slab having a face thereof integrally bonded to a layer of bitumen felt, where said bonding is accomplished by heating excess bitumen of the felt prior to application to the wood wool slab.

A further embodiment of the manufacture permits a sheet material such as paper, rubber, butyl or polyisobutyl sheeting or the like, to be integrally bonded to the remaining face of the bitumen felt, said bonding accomplished by heating excess bitumen of the remaining felt face and applying said sheets prior to, simultaneously with, or after application of the bitumen felt to the wood wool slab.

---

The object of this invention is to provide a method for the production of a laminate comprising wood wool slab having a face thereof integrally bonded to a layer of bitumen felt by the bitumen of the felt.

In accordance with the practice of this invention this object is achieved by a method comprising the steps of providing a wood wool slab having a face and a layer of bitumen felt having at least one facing portion bearing excess bitumen in bonding proportions, said bitumen felt and said excess bitumen preferably having a total weight of above about 40 lbs. per 12 square yards, melting said excess bitumen on said facing portion and applying said facing portion against said face of said wood wool slab, and maintaining said facing portion against said face whilst causing said melted excess bitumen to set thereby to bond said bitumen felt to said slab by said excess bitumen. The total weight of said felt and said excess bitumen may desirably be about 40 to 55 lbs. per 12 square yards, e.g., about 45 lbs. per 12 square yards.

One suitable felt is a B.S. 747 type 1C self-finished bitumen roofing felt having a basis weight of about 30 lbs. per 12 square yards with an extra coating of bitumen on one side to give a total weight of about 45 lbs. per 12 square yards. Other types of bitumen felts which may be employed are those based on asbestos or glass fibre, examples being B.S. 747 type 2B self-finished bitumen asbestos felts and B.S. 747 type 5A bitumen glass fibre felts, the excess bitumen on one side of the felt again preferably bringing the overall weight up to above 40 lbs. per 12 square yards, e.g., 40 to 55 lbs. per 12 square yards.

The novel felt faced slab provided in accordance with the invention is suitable for roof decking, the felted surface serving as a base for one or more layers of roofing felt to form a system of roof weathering known as bituminous built-up roofing.

The felt employed may be wider than the wood wool slab, the felt overlap at the edges of the slab facilitating jointing.

The accompanying drawing is a diagrammatic representation of apparatus suitable for use in the production of felt faced slabs according to the invention.

Referring to the drawing there is shown a roller table 1 which conveys wood wool slabs 14 end to end through a thicknessing machine 2 and thence to pinch rolls 7 whereat the slabs are coated with felt.

The rollers 15 are driven to move the slabs towards the thicknessing machine at any convenient speed, a speed of 10 to 20 ft./min. being found suitable in practice. The standard thicknessing machine 2 is connected to a dust collector (not shown) and is provided with serrated drive rollers 3 which are preferably adjusted to move the slabs through the thicknessing machine at a slower rate than that at which they approach it, thus ensuring that the slabs butt together.

Slabs of substantially constant predetermined thickness emerge from the thicknessing machine 2 and travel along a further section 4 of the table assisted by a drive roller 5 and/or by rollers 6 adjusted to maintain the same linear speed as imparted by the serrated rollers 3.

The slabs 14 pass from the roller table 4 between pinch rolls 7, the bottom one of which has a fixed axis and the top one of which is free to move vertically but not horizontally.

Bitumen felt 17, e.g., of the type 1C, 2B or 5A mentioned above and having excess bitumen in or on one face to give a total weight of 40 to 55 lbs. per 12 square yards, is led from a storage roll 8 over and under tensioning rolls 9, 10 and 11 and then over and around the top floating roll of the pinch rolls 7 with the heavily bituminised face exposed. This top roll may be of sufficient weight to press the felt down on the top of the wood wool slabs, or it may be spring loaded, but in either case it is free to move in a vertical plane in order to take up any irregularities in their surface. This top roll is hollow and kept cool by circulating cold water through it.

A series of gas jets 12 play on the exposed surface of the felt as it passes over the top inch roll 7, melting the bitumen on the surface of the felt before it comes in contact with the wood wool slab. The felt is pressed on to the wood wool slab by the top floating roller. The position of these gas jets is adjustable in the horizontal and vertical plane and it may be found desirable to utilise a second series of gas jets positioned above the first series in order to preheat the felt. Suitable fire protection devices (not shown) are incorporated in the gas burners to shut off the flame if for any reason movement of the bitumen felt ceases.

Thus the heated felt and wood wool slab are brought into contact through the pinch rolls 7 and the floating or spring loaded top pinch roll presses the felt on to the wood wool slab.

The slabs with felt bonded on then pass under an ironing roll 13. This roll can either be free to move in a vertical plane and act through its own weight or be spring loaded. Preferably it comprises a series of short rolls each no more than 4" long mounted on a common shaft and all free to act by their own weight by virtue of their not being a close fit on the common shaft. Alternatively each roll can be individually spring loaded. The preference for short rolls on a common shaft or short individual spring loaded rolls rather than one long roller is in order to take up any irregularities in thickness across the width of the slab.

The felt used in the process is an especially prepared felt having a higher than normal content of bitumen on at least that side which is to be bonded to the wood wool slab.

The slabs with felt bonded to the upper surfaces continue along a roller table and under a suitable cut off knife which parts the felt. Various types of automatic cut off knives can be used as a rotary cutter or travelling saw synchronised to the speed of the moving slabs or an electrically heated knife blade moving across the joint between the slabs parting the felt and at the same time moving forward at the same speed as the slabs.

It will thus be apparent that the invention provides a laminate comprising wood wool slab having a face thereof integrally bonded to a layer of bitumen felt by the bitumen of the felt, and also a novel and efficient method and apparatus whereby said novel laminate may readily and speedily be fabricated in continuous manner.

In a further embodiment of the invention a sheet material such as paper, rubber or butyl or polyisobutyl sheeting or the like, is integrally bonded to the other face of the felt by the bitumen of the felt before, after or simultaneously with the bonding of the wood wool slab to the said one face, and in essentially the same manner, i.e., by heating the said other face of the felt to melt the bitumen, applying it to a face of the sheeting and thereafter allowing or causing the assembly to cool to form a laminate. The same felts as described above can be used, or the felt may also bear excess bitumen on its said other face.

In a preferred method bitumen felt is continuously bonded to wood wool slabs as specifically described above and shown in the drawings, the resulting laminate continuing along a roller table past a further series of gas jets which play on the exposed upper surface of the felt to melt the bitumen thereof. The sheet, e.g., of paper or plastics material, is fed under gravity from a store roll, passed around tensioning rollers and applied to the heated surface of the felt/wood wool laminate as they pass together between cooled pinch rolls. The resulting laminate passes under an ironing roll and then past severing means which cuts the laminate transversely, e.g., along the lines where the slabs abut. The pinch and ironing rolls and severing means are mounted in the same manner as shown in the drawings.

This embodiment of the present invention thus provides, by a cheap and efficient method, a laminate the bitumen felt of which provides a waterproof seal between the sheeting and the wood wool slab. The felt also provides a resilient bond between the sheet and the slab which minimises mechanical damage to the sheeting.

We claim:

1. In the method of forming a felt-faced wood wool slab in which a layer of felt is bonded to a face of the wood wool slab, the improvement which comprises providing a layer of felt having a facing portion bearing excess bitumen in bonding proportions, melting said excess bitumen by heating said facing portion, and applying said facing portion of said felt layer to said face of said slab and thereafter causing the resulting assembly to cool, thereby to form a laminate in which said felt is bonded to said slab by said excess bitumen.

2. A method of forming a felt-faced wood wool slab comprising the steps of providing a wood wool slab having a face and a layer of bitumen felt having at least one facing portion bearing excess bitumen in bonding proportions, said bitumen felt and said excess bitumen having a total weight of above about 40 lbs. per 12 square yards, melting said excess bitumen on said facing portion and applying said facing portion against said face of said wood wool slab, and maintaining said facing portion against said face whilst causing said melted excess bitumen to set thereby to bond said bitumen felt to said slab by said excess bitumen.

3. The method as set forth in claim 2 in which said bitumen felt and said excess bitumen give a total weight of about 40 to 55 lbs. per 12 square yards.

4. The method as set forth in claim 2 in which said bitumen felt is a roofing, asbestos, or glass-fibre bitumen felt.

5. The method as set forth in claim 1 in which said layer is a layer of bitumen roofing felt of a basic weight of about 30 lbs. per 12 square yards, said excess bitumen in said facing portion resulting in a total weight of said felt of about 45 lbs. per 12 square yards.

6. A method of forming a laminate comprising the steps of providing a wood wool slab having a face, a layer of bitumen felt having first and second opposed faces with said first face bearing excess bitumen in bonding proportions, and a sheet material having a face; melting said excess bitumen on said first face of said felt, applying said face of said wood wool slab thereagainst, and maintaining them in contact whilst causing said melted excess bitumen to set thereby to bond said bitumen felt to said slab by said excess bitumen; heating said second face of said bitumen felt, applying said face of said sheet material against said heated first face and maintaining it thereagainst whilst causing said second face to cool thereby to bond said sheet material to said bitumen felt by the bitumen of said felt.

References Cited

UNITED STATES PATENTS

| | | | |
|---|---|---|---|
| 1,044,558 | 11/1912 | Moeller | 161—205 |
| 2,124,921 | 7/1938 | Lederer | 161—156 |

WILLIAM J. VAN BALEN, Primary Examiner

ROBERT F. BURNETT, Assistant Examiner

U.S. Cl. X.R.

156—82; 161—156, 202, 205, 237, 238